Nov. 12, 1935.  W. SCHAELCHLIN  2,020,911
CIRCUIT BREAKER
Filed Sept. 27, 1933  4 Sheets-Sheet 2
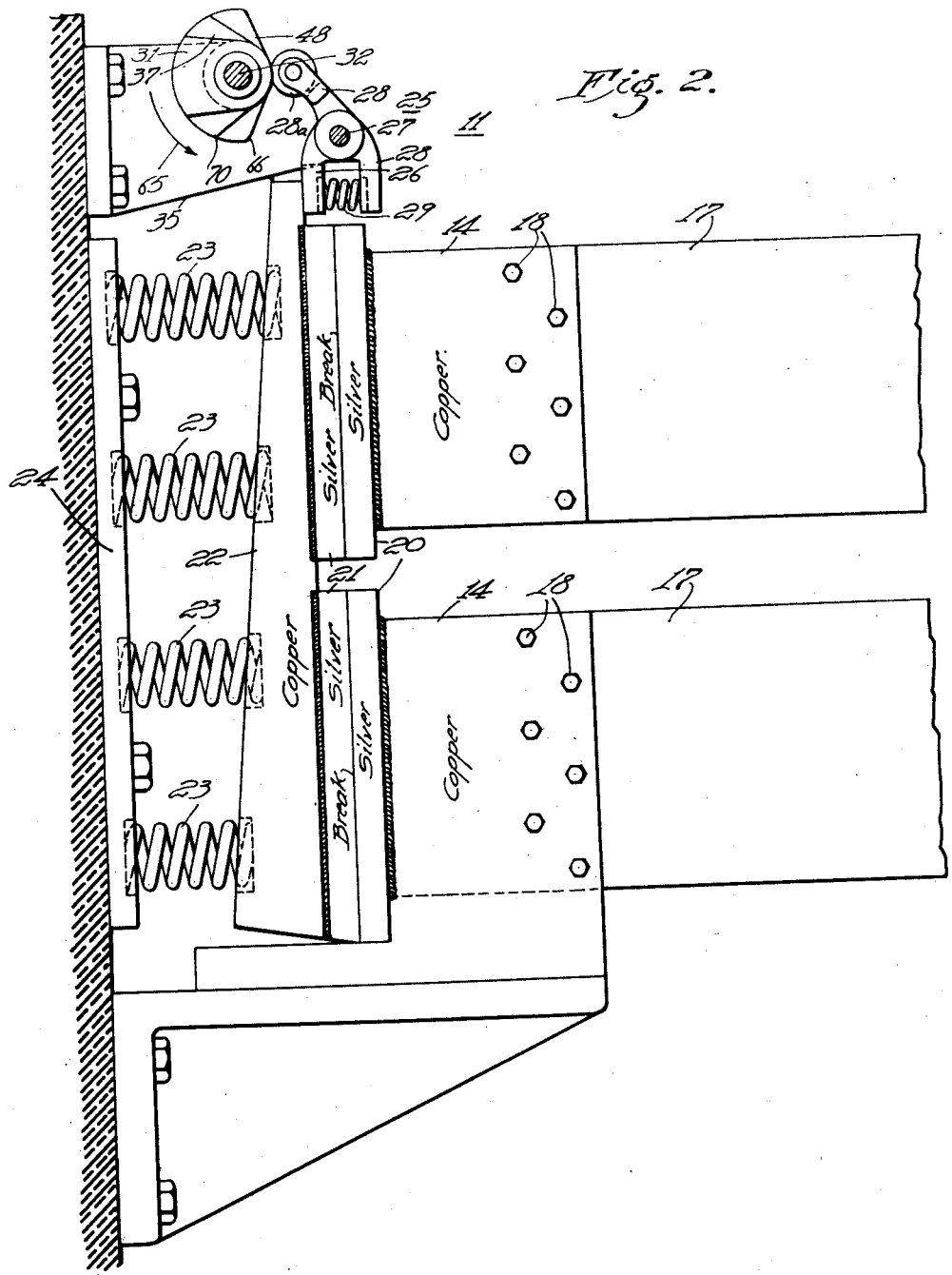
WITNESSES:
INVENTOR
Walter Schaelchlin.
ATTORNEY Nov. 12, 1935.  W. SCHAELCHLIN  2,020,911
CIRCUIT BREAKER
Filed Sept. 27, 1933  4 Sheets-Sheet 3
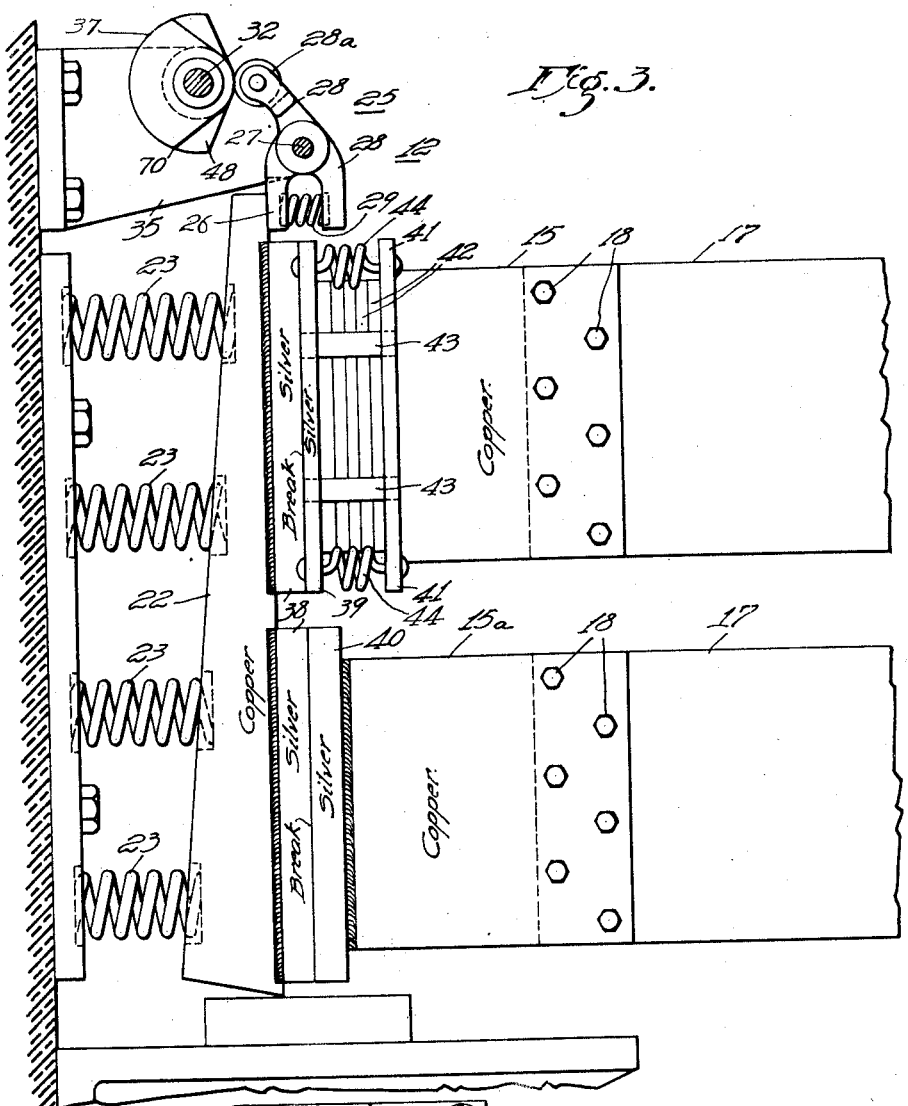
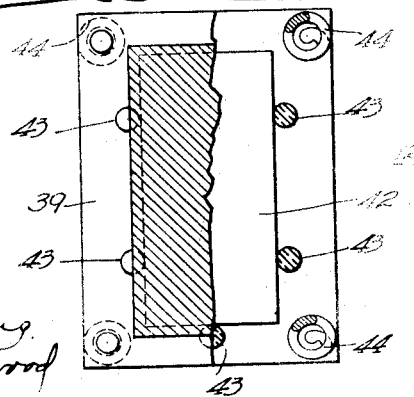
WITNESSES:
INVENTOR
Walter Schaelchlin.
ATTORNEY

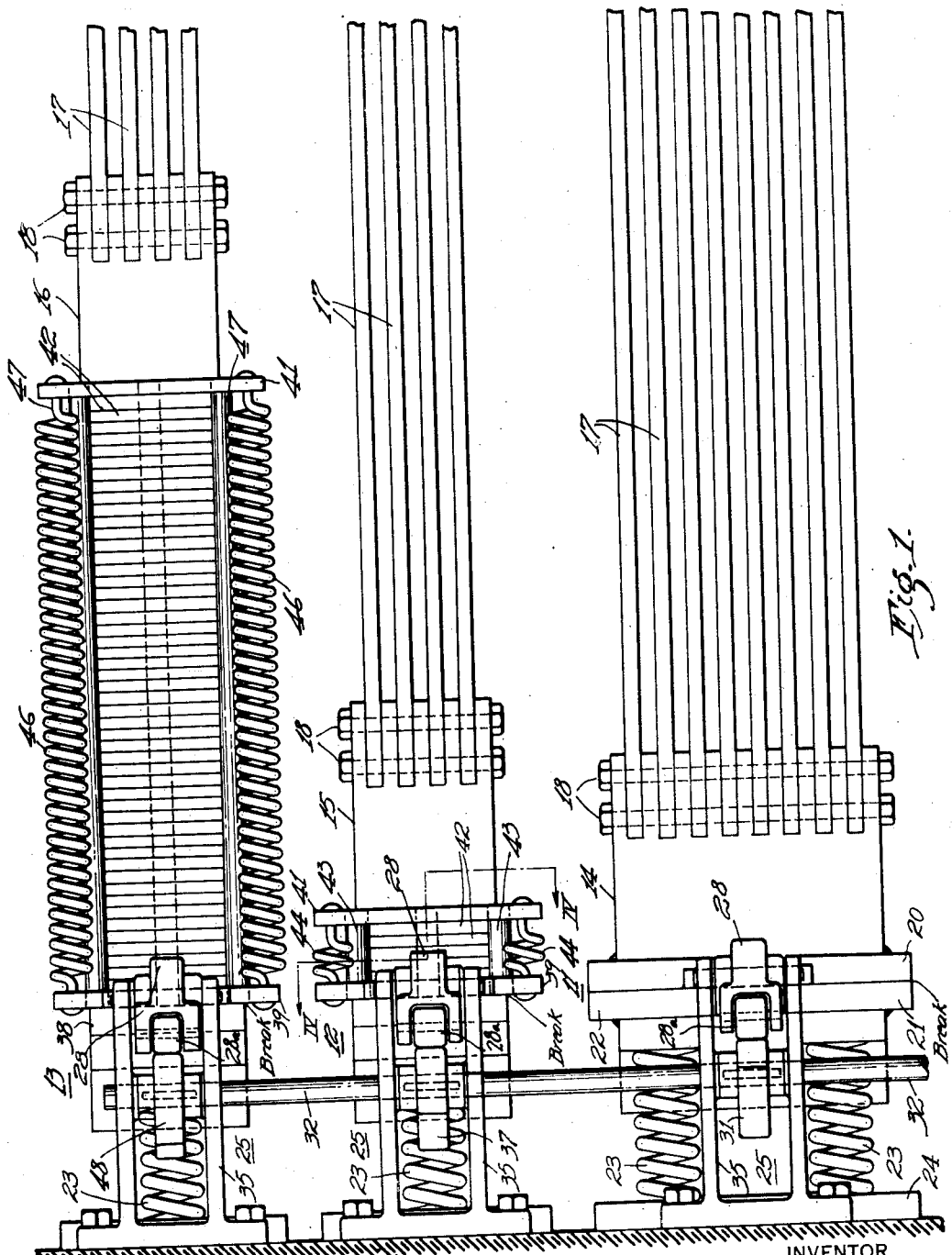

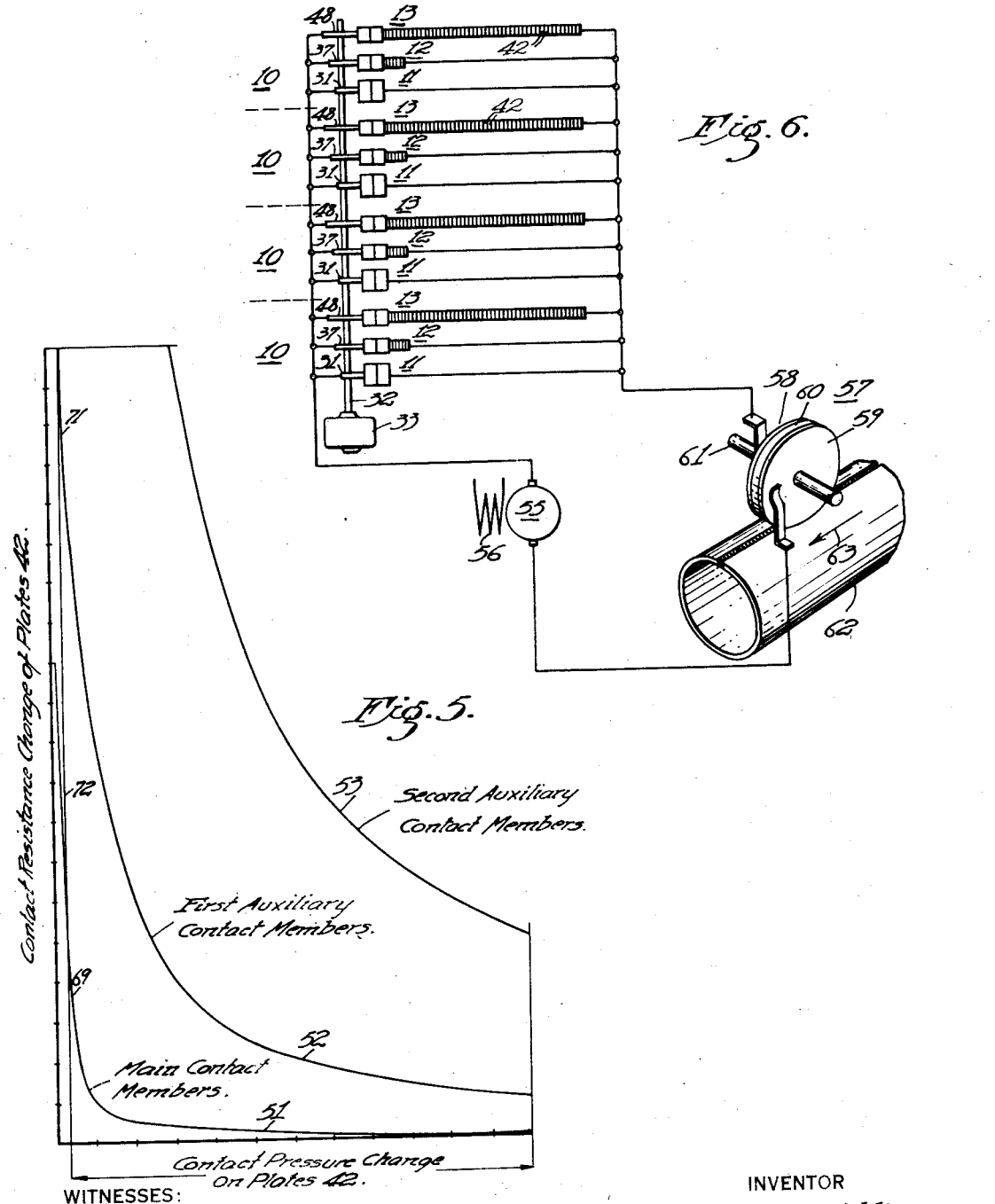

Patented Nov. 12, 1935

2,020,911

UNITED STATES PATENT OFFICE 2,020,911

CIRCUIT BREAKER

Walter Schaelchlin, Wilkinsburg, Pa., assignor to Westinghouse Electric & Manufacturing Company, East Pittsburgh, Pa., a corporation of Pennsylvania Application September 27, 1933, Serial No. 691,148

10 Claims. (Cl. 200—144)

My invention relates, generally, to circuit making and breaking devices and it has particular relation to contact-pressure adjustment in such devices.

When a longitudinal seam weld is made in pipes, a very great amount of current is required in order to perform the welding operation. This amount of current is required because of the fact that the resistance welding method is ordinarily used, which method inherently requires an immense volume of current for its successful operation. The welding voltage may, however, be relatively low, only sufficient voltage being necessary to overcome the voltage drop in the circuit caused by the resistance of the conductors and the contact resistance in the pipe joined to it.

When a direct current source is used to provide the large welding current, it is necessary to generate the actual number of amperes of current used in the generator for the reason that it is impossible, with direct current, to use a device corresponding to a transformer which may be used with alternating current.

In performing the resistance welding operation, the pipes are necessarily not of an indefinite length but are customarily formed into relative short lengths such as 30 to 40 feet long. Therefore, it is essential that the flow of welding current be interrupted as soon as a weld is completed and that it should again be applied to the welding apparatus when it is desired to weld the next pipe.

For this pipe welding application, it has been proposed to use direct current generators of two different types, namely, a generator of the commutator type and a generator of the homopolar type. Each of these generators has certain advantages which are not present in the generator of the other type. It is thought that either type of generator may be used to satisfactorily supply the immense quantities of current required for performing the welding operation. It is necessary, however, to provide some means for interrupting the flow of current at the end of a welding operation.

In order to interrupt the current flow, it has been proposed to use the method of field control, that is, the current flowing through the field winding of the generator would be reduced to zero, thereby reducing the current generated in the armature to zero because of the absence of field flux. This method of current control, however, is open to the very serious objection that a considerable time is required in order to reduce the field flux to a substantially negligible value so that the current flowing in the armature will be reduced to a corresponding value. This condition is due to the fact that the inductance of a field winding for a generator of this size is necessarily large and it is especially high in a generator of the homopolar type, as will be well understood by those skilled in the art.

In view of the fact that it is not feasible to control the current flow in the welding circuit by controlling the current flow in the field winding of the generator, since by this means it is not possible to obtain the speed of welding that is desired, I propose to open the circuit connecting the generator to the welding apparatus at the termination of the welding operation and to again close the circuit when it is desired to initiate the welding operation. It will be understood that this method for controlling the flow of welding current presents certain problems and difficulties which have not heretofore been solved, chiefly because of the fact that currents of the magnitude herein proposed have never before been generated continuously for an operation in which it was necessary to interrupt the flow of welding current at relatively short intervals. In this particular application, it is proposed to open and close the welding circuit approximately once each minute.

In the past, direct current circuits have been opened by means of well known circuit breaker means whereby the circuit is substantially instantaneously interrupted by a mechanical interrupter. An arc is ordinarily drawn when the contact members are separated under load conditions and this arc persists as long as the ionized arc path is maintained. Ordinarily, however, the contact members are moved sufficiently far apart so that the arc is extinguished without any serious difficulty.

I have observed that when a direct current circuit is opened in the manner set forth, a tremendous amount of energy is concentrated at the arcing terminals of the contact members. When the ordinary currents, which are encountered at present in direct current practice, are multiplied to equal the current values which it is proposed to use for the resistance welding operation, it will be readily understood that exceedingly large concentrations of energy will occur if the circuit is opened by a single set of contact members.

According to the practice of the prior art an electric circuit is ordinarily opened at a single point by a single set of contact members. The flow of current is not transferred to any other path but it must be interrupted in its entirety. The operation for actually interrupting the entire flow of current not only involves the arcing at the contact members but it also presents the problem of compensating for the electro-dynamic forces that exist tending to force the contact members apart.

Fundamentally then, my invention comprises the provision for opening a circuit gradually to insert a sufficient amount of distributed contact resistance into the circuit to reduce the current flow therein to a relatively small value before completely opening the circuit, rather than to suddenly open the circuit, as has been the practice in the past, with the usual high concentration of energy which it has been necessary to dissipate in the form of an arc or contact drop with the attendant destruction of the contact surfaces.

In order to obtain the desired increase in contact resistance, I have provided for using contact members, the contact surfaces which are in engagement, being composed of silver. As the result of exhaustive tests, I have found that a material, such, for example, as silver possesses the required characteristics of contact resistance and resistance to wear and corrosion, which are admirably suited for my purposes. I have provided for gradually opening the main contact members by reducing the pressure applied thereto in a predetermined manner so that the current flow therethrough will be decreased in accordance with the increase in contact resistance caused by the decrease in contact pressure.

In shunt circuit relation with the main contact members, I have provided auxiliary contact members, the inherent contact resistance of which is greater than that of the main contact members. When the contact pressure applied to the main contact members has been reduced to such a point that the contact resistance thereof is greater than that of the auxiliary contact members, the main contact members are opened and the contact pressure applied to the auxiliary contact members is gradually relieved until the current flowing in the circuit is further reduced. Additional auxiliary contact members are provided to further decrease the current as may be desired.

I have experimented with other material such as carbon and various alloys, but I have found that none of them are as suitable for my purposes as silver for the reason that the contact resistance thereof is too high or is not sufficiently constant or that they tend to corrode or become oxidized. It is essential for the successful operation of my invention to provide contact members, the contact resistance of which is low and which will remain constant over long periods of operation, which will not readily corrode, and which will vary in the same manner inversely with the applied pressure.

In view of the foregoing, the object of my invention, generally stated, is to provide a circuit breaker which shall be simple and efficient in operation and which may be readily and economically manufactured and installed.

The principal object of my invention is to provide for opening a high-amperage direct-current circuit.

Another object of my invention is to provide for opening a circuit capable of conducting direct currents of the order of 150,000 amperes.

Another object of my invention is to provide for inserting resistance in a high-current circuit.

Another object of my invention is to provide for gradually inserting contact resistance in a high-current circuit in order to reduce the current flow therein to zero.

Another object of my invention is to gradually and successively reduce the contact pressures between a plurality of contact members in order to gradually insert different values of contact resistance up to an infinite value in a high-current circuit.

Still another object of my invention is to provide for transferring the current flow in a high-current circuit from one set of parallel-connected contact members to successive contact members by successively increasing the contact resistance of the contact members.

A further object of my invention is to provide for opening a high-current circuit by inserting successive steps of contact resistance and for closing the circuit by reversing the opening sequence of operation.

Other objects of my invention will in part be obvious and in part appear hereinafter.

My invention accordingly is disclosed in the embodiment hereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description taken in connection with the accompanying drawings, in which Figure 1 is a plan view showing a circuit breaker or switch constructed in accordance with my invention;

Fig. 2 is a view, in side elevation, of the circuit breaker illustrated in Fig. 1;

Fig. 3 is a view, in side elevation, of the first set of auxiliary contact members shown in Fig. 1;

Fig. 4 is a sectional view taken along the line IV—IV of Fig. 1;

Fig. 5 shows a number of curves which demonstrate the characteristics possessed by the different contact members constructed in accordance with my invention; and Fig. 6 is a diagram illustrating how the circuit breaker may be connected into a welding circuit.

Referring now particularly to Fig. 1 of the drawings, the reference character 10 designates, generally, a circuit breaker or switch having a set of main contact members, shown generally at 11, and first and second auxiliary contact members, shown generally at 12 and 13, respectively. The contact members 11, 12, and 13 are provided with studs 14, 15, and 16, respectively, to which bus bars comprising preferably copper straps 17 may be connected in the customary manner by bolts 18. The studs 14, 15, and 16 will preferably be constructed of copper also. The contact members 11, 12, and 13 are disposed to be connected in parallel circuit relation as will be set forth hereinafter.

Referring now particularly to Fig. 2 of the drawings showing the main set of contact members 11 in side elevation, it will be observed that the studs 14 terminate in contact pieces 20 which are preferably composed of silver. The contact pieces 20 may be secured to the studs 14 in any suitable manner such as by welding, as illustrated.

In order to bridge the contact members 20 additional contact members 21, also composed of silver, are mounted on a connecting member 22 which may be composed of copper. A series of springs 23 is provided for obtaining the desired contact pressure between the contact pieces 20 and 21, as illustrated. The springs 23 are disposed between the connecting member 22 and a suitable support 24. The springs 23 are sufficiently powerful to provide the desired contact pressure between the contact pieces 20 and 21 so that the contact resistance therebetween will be reduced to a minimum.

It will be observed that the connecting member 22 is pivotally mounted at its lower end and that it serves to directly connect the studs 14 thereby obviating the necessity for the use of a flexible shunt which is customarily used for such purposes.

As set forth hereinbefore, it is desirable to gradually reduce the contact pressure which is applied between the contact pieces 20 and 21 in order to increase the contact resistance and thereby reduce the current flow therethrough. In order to reduce the contact pressure, a lever arrangement, shown generally at 25, is provided comprising a short lever 26 pivoted on a suitable axle 27 and an operating lever 28, carrying a roller 28a, also pivoted on the axle 27. Interposed between the levers 26 and 28 is a spring 29 which serves to resiliently transmit the movement of the operating lever 28 to the lever 26, as will be readily understood.

The roller 28a carried by the operating lever 28 is disposed in engagement with a cam 31 which is mounted to rotate with a shaft 32 that may be driven by any suitable means such as a motor 33 (as shown in Fig. 6 of the drawings). The shaft 32 is mounted for rotation on suitable bearing brackets 35 as illustrated.

Referring now particularly to Fig. 3 of the drawings, in which is shown a side elevation of the first set of auxiliary contact members 13, it will be observed that the construction is similar to that of the set of the main contact members 11. The same general type of operating mechanism is used but a differently shaped cam 37 is provided for engaging the roller 28a carried by the operating lever 28 for a purpose which will be set forth hereinafter. The connecting member 22 is provided with contact pieces 38 composed of silver which are arranged to engage corresponding contact pieces 39 and 40 located at the ends of the studs 15 and 15a, respectively. The springs 23 serve to provide the desired contact pressure.

It will be observed that the stud 15 terminates in a contact piece 41 which may be welded thereto and that several plates 42, preferably composed of silver or silver plate, are interposed between the contact pieces 39 and 41. The silver plates 42 are secured in position by means of fibre rods 43 and by means of springs 44 which may serve to keep the silver plates 42 juxtaposed and which are adjusted to apply only a definite minimum contact pressure thereto, so that arcing therebetween is entirely prevented because of the fact that they always are maintained in contact engagement.

The construction of the second auxiliary set of contact members 13 is similar to that of the first set of auxiliary contact members 12 with the exception that a larger number of silver plates 42 is provided between the contact pieces 39 and 41. In addition, longer springs 46 are provided for maintaining the desired minimum contact pressure together with longer fibre rods 47, as illustrated, for holding the silver plates 42 in position. A differently shaped cam 48 is provided which is more clearly shown by the dotted lines in Figs. 2 and 3 and which is mounted to rotate with the shaft 32.

Although the silver plates 42, forming a part of auxiliary contact members 13, have been illustrated as being of the same thickness as those shown in connection with auxiliary contact members 12, it will be understood that they may be much thinner since they are used to provide the desired contact resistance which, for practical purposes is independent of the thickness.

Referring now particularly to the curves illustrated in Fig. 5 of the drawings, it will be observed that the curves 51, 52, and 53 represent the variation in contact resistance of the different sets of contact members 11, 12 and 13, respectively, with change in pressure. It will also be observed that the contact resistance of the main set of contact members 11 is reduced to a minimum when the maximum pressure is applied thereto and that this resistance under the condition of maximum pressure is considerably less than the corresponding contact resistance, as represented by the curve 52, of the first set of auxiliary contact members 12. Correspondingly, the contact resistance of the first set of auxiliary contact members 12, as represented by the curve 52 is considerably less than that of the second set of auxiliary contact members 13, as represented by the curve 53. These differences in contact resistances are due to the fact that the succeeding auxiliary contact members 12 and 13 are provided with the silver plates 42 which serve to increase the contact resistance thereof. Due to the fact that a greater number of silver plates 42 is provided for the second set of auxiliary contact members 13 than is provided for the first set 12, the contact resistance thereof, when maximum pressure is applied, is considerably higher.

Since the products of the pressures applied to the contact members 11, 12, and 13 and the corresponding resistances thereof, are constants, the curves 51, 52 and 53 will assume the form of one part of a rectangular hyperbola. The different ordinates at the right-hand ends of the curves indicate the different contact resistances of the contact members 11, 12, and 13 when maximum contact pressure is applied thereto. Due to space limitations, curve 53 is not shown to the same full extent as curves 51 and 52.

It will be understood that any suitable arcing tips may be applied to the contact members 11, 12, and 13 as may be desired in order to insure that no arc will be broken by any of the engaging silver contact surfaces. Since such contact tips are well known in the art, they are not shown or described further herein.

As illustrated in Fig. 6 of the drawings, the switch 10 may be connected in parallel circuit relation with three additional similar switches or circuit breakers 10 in order to provide the desired current carrying and interrupting capacity. The cams 31, 37, and 48 may all be mounted on a single shaft 32 and driven by the motor 33 as set forth hereinbefore. Because of the resistance of the conductors connecting the various switches 10 in parallel circuit relation, the load will be divided substantially uniformly between them and each will carry only its proportionate share of the load.

A generator 55 having a field winding 56 is provided for supplying current for performing the welding operation to welding apparatus which may be represented diagrammatically by a welding wheel, shown generally at 57, comprising a pair of circular electrodes 58 and 59 separated by suitable insulation 60 and mounted for rotation on a shaft 61. The electrodes 58 and 59 are arranged to engage the edges of a pipe blank 62 which may be moved by any suitable means in the direction of the arrrow 63 to perform a welding operation.

It will be understood that the generator 55 may be of any suitable type such as the commutator or homopolar type.

In operation, the motor 33 may be arranged to operate in synchronism with the apparatus which is used to feed the pipe blank 62 underneath the welding wheel 57 by any suitable means such as limit switches (not shown). It will be assumed that the main and auxiliary sets of contact members 11, 12, and 13 are closed as illustrated in Fig. 1 of the drawings, and that the pipe blank 62 has been moved to such a position that the welding operation has been nearly completed. While the welding operation is being performed, the cams 31, 37, and 48 will be disposed in such positions that the maximum forces may be exerted by the springs 23 to provide the maximum contact pressure and thereby the minimum contact resistance in the welding circuit.

The cams 31, 37, and 48, being rotated by the motor 31 in the direction indicated by the arrow 65 in Fig. 2 of the drawings, will cause the roller 28a, carried by the operating lever 28 and associated with the main set of contact members 11, to be engaged by the cam 31 at the point 66 on its surface. The operating lever 28 will then be rotated about the axle 27 to compress the spring 29 and thereby overcome the biasing forces exerted by the springs 23 to reduce the contact pressure between the contact pieces 20 and 21. The contact resistance thereof will then vary as indicated by the curve 51 in Fig. 5 of the drawings.

The change of contact pressure is continued and the effective resistance of the contact pieces 20 and 21 vary along the curve 51 until some point such as 69 is reached. While the contact resistance of the main contact members 11 is still a finite value, it is, at this point, considerably higher than the contact resistance of the first set of auxiliary contact members 12. The current flowing through the main set of contact members 11 will then be reduced to a value corresponding to the contact resistance. Because of the lower resistance of the auxiliary contact members 12, the maximum remaining portion of the welding current will flow therethrough. The main contact members 11 may then be opened with the attendant formation of little or no arcing.

After the main contact members 11 are opened, the point 70 of the cam 37 is caused to engage the roller 28a, carried by the operating lever 28 associated with the first set of auxiliary contact members 12, thereby causing the contact pressure therebetween to be reduced in such manner as to follow the curve 52 illustrated in Fig. 5 of the drawings. The contact pressure between the silver plates 42 of the contact members 12 is reduced until a point 71 is reached which indicates the intersection of the curve 52 with an ordinate 72 which represents the definite minimum pressure that is applied to the silver plates by the springs 44. Because of the high contact resistance that is now inserted in the circuit by the first set of auxiliary contact members 12, the current flow therethrough will be correspondingly reduced and it will be transferred to the second set of auxiliary contact members 12. The contact members 12 may then be opened.

In like manner the second set of auxiliary contact members 13 may be released to increase the resistance thereof as indicated by the curve 53. This set of contact members may be finally opened, thereby completely opening the welding circuit and preventing the further flow of current.

When it is desired to reclose the welding circuit, the foregoing sequence of operations may be repeated in reverse order. That is, the cams 31, 37, and 38 are so shaped that the auxiliary contact members 13 may be closed first, the auxiliary contact members 12 next, and the main contact members 11 last. In this manner there is a smooth transition from the open circuit to the close circuit condition as well as from the close circuit to the open circuit condition.

While the circuit breaker 10 has been illustrated as comprising a main set of contact members 11 and two sets of auxiliary contact members 12 and 13, it will be readily apparent that three or more sets of auxiliary contact members may be provided utilizing a larger number of silver plates 42 for the third auxiliary set of contact members. This modification of the invention may be found to be desirable under certain particular conditions of current values which it is desired to interrupt.

It will also be understood that the relative positions of the bus bars on straps 17 connecting the circuit breaker 10 to the welding circuit may be altered so that they will form a substantially straight conductor thereby reducing the stress incident to conductors carrying a large current. However, for the purposes of illustration, and simplicity in description, the copper straps or busses have been illustrated as extending parallel to each other.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. In a circuit breaker, in combination, a set of main contact members, means for gradually decreasing the contact pressure between said contact members, thereby increasing the contact resistance thereof as a predetermined function of the change in main contact pressure, a plurality of sets of auxiliary contact members connected in parallel circuit relation to said main contact members, and means for successively decreasing the contact pressure between said sets of auxiliary contact members when the contact resistance of said main contact members has been increased to a predetermined value, thereby increasing the contact resistance thereof as a predetermined function of the change in main contact pressure.

2. In a circuit breaker, in combination, a main set of contact members and a plurality of sets of auxiliary contact members connected in parallel circuit relation, the contact resistance of each succeeding set of auxiliary contact members being inherently greater than the contact resistance of the preceding set, means for gradually and successively releasing the contact pressure applied to said contact members in the order named, and means for reapplying contact pressure to said contact members in reverse order.

3. In a circuit breaker, in combination, a plurality of sets of contact members disposed to be connected in parallel circuit relation, the contact resistance of each succeeding set of contact members being inherently greater than the contact resistance of the preceding set, means for applying predetermined contact pressure to said contact members, means for successively and gradually releasing the contact pressure between said contact members, thereby increasing the contact resistance thereof as a predetermined function of the change in contact pressure, the contact pressure between each successive set of contact members being released when the contact resistance of the preceding set of contact members is increased to a value greater than the resistance of the next succeeding set of contact members.

4. A circuit breaker comprising, in combination, a set of main contact members having engaging contact surfaces of silver, a set of auxiliary contact members including a plurality of continuously engaged silver plates, means for connecting said sets of contact members in parallel circuit relation, means for applying contact pressures to said sets of contact members, the inherent contact resistance of said set of auxiliary contact members being greater than the inherent contact resistance of said set of main contact members, and means for gradually releasing the contact pressures between said sets of contact members, the contact pressure between the main contact members being released first.

5. A circuit breaker comprising, in combination, a set of main contact members having engaging contact surfaces of silver, a set of auxiliary contact members including a plurality of continuously engaged silver plates, means for connecting said sets of contact members in parallel circuit relation, resilient means for applying predetermined contact pressures to said sets of contact members, the contact resistance of said set of auxiliary contact members being greater than the contact resistance of said main contact members, operating means for releasing the contact pressure between said sets of contact members, thereby increasing the contact resistance of said sets of contact members as a predetermined function of the change in contact pressure, and resilient means interposed between said operating means and said sets of contact members to permit a gradual transition from the close to the open position.

6. A circuit breaker comprising, in combination, a set of main contact members having low contact resistance non-corrosive engaging contact surfaces, a first set of auxiliary contact members including a relatively small number of continuously engaged plates composed of low contact resistance non-corrosive material, a second set of auxiliary contact members including a relatively large number of said plates, means for connecting said sets of contact members in parallel circuit relation, means for applying contact pressures to said sets of contact members, and means for gradually and successively reducing said contact pressures from said sets of contact members in the order named.

7. A circuit breaker comprising, in combination, a set of main contact members having engaging contact surfaces of silver, a first set of auxiliary contact members including a relatively small number of continuously engaged silver plates, a second set of auxiliary contact members including a relatively large number of continuously engaged silver plates, means for connecting said sets of contact members in parallel circuit relation, means for applying contact pressures to said sets of contact members, and means for gradually and successively reducing said contact pressures from said sets of contact members in the order named, thereby increasing the resistance of the circuit breaker in an electric circuit from a relatively small value to an infinite value.

8. A circuit breaker comprising, in combination, a set of main contact members having engaging contact surfaces of silver, a plurality of sets of auxiliary contact members, each succeeding set of auxiliary contact members including a larger number of continuously engaged silver plates, means for connecting said sets of contact members in parallel circuit relation, the inherent contact resistance of each succeeding set of contact members being greater than the inherent contact resistance of the preceding set of contact members, and operating means for gradually releasing the contact pressures between said sets of contact members, the contact pressure between said set of main contact members being released first and opened, succeeded by the release of the contact pressure on the set of auxiliary contact members having the next higher resistance.

9. A circuit breaker comprising, in combination, a set of main contact members, the engaging contact surfaces thereof comprising silver, a first set of auxiliary contact members including a relatively small number of continuously engaged silver plates disposed to be connected in series circuit relation with an electric circuit, a second set of auxiliary contact members including a relatively large number of continuously engaged silver plates disposed to be connected in series circuit relation with an electric circuit, resilient means for applying a slight contact pressure to the silver plates of the auxiliary contact members, means for connecting said contact members in parallel circuit relation, resilient means for applying main contact pressure to the main and auxiliary contact members, cam means operatively connected to said main contact members for gradually releasing the contact pressure therebetween, additional cam means individual to each auxiliary set of contact members for releasing the main contact pressure imposed by said second named resilient means, said cams being so shaped as to cause the set of main contact members to open first, the first set of auxiliary contact members to open next, the second set of auxiliary members to open last and to close said sets of contact members in reverse order, resilient means interposed between said cam means and said sets of contact members to permit a gradual movement thereof to the open and close positions and means for rotating said cams at a predetermined speed.

10. A circuit breaker system comprising, in combination, a plurality of individual circuit breakers each comprising a set of main contact members, the engaging contact surfaces thereof comprising silver, a first set of auxiliary contact members including a relatively small number of continuously engaged silver plates disposed to be connected in series circuit relation with an electric circuit, a second set of auxiliary contact members including a relatively large number of continuously engaged silver plates disposed to be connected in series circuit relation with an electric circuit, resilient means for applying a slight contact pressure to the silver plates of the auxiliary contact members, means for connecting said contact members in parallel circuit relation, resilient means for applying contact pressure to the main and auxiliary contact members, cam means operatively connected to said main contact members for gradually releasing the contact pressure therebetween, additional cam means individual to each auxiliary set of contact members for releasing the main contact pressure imposed by said second named resilient means, said cams being so shaped as to cause the set of main contact members to open first, the first set of auxiliary contact members to open next, the second set of auxiliary members to open last and to close said sets of contact members in reverse order, resilient means interposed between said cam means and said sets of contact members to permit a gradual movement thereof to the open and close positions, and means for rotating said cams at a predetermined speed.

WALTER SCHAELCHLIN.